June 6, 1961 H. E. KALLMANN 2,987,669
HALL EFFECT ELECTROMECHANICAL SENSING DEVICE
Filed Jan. 19, 1959
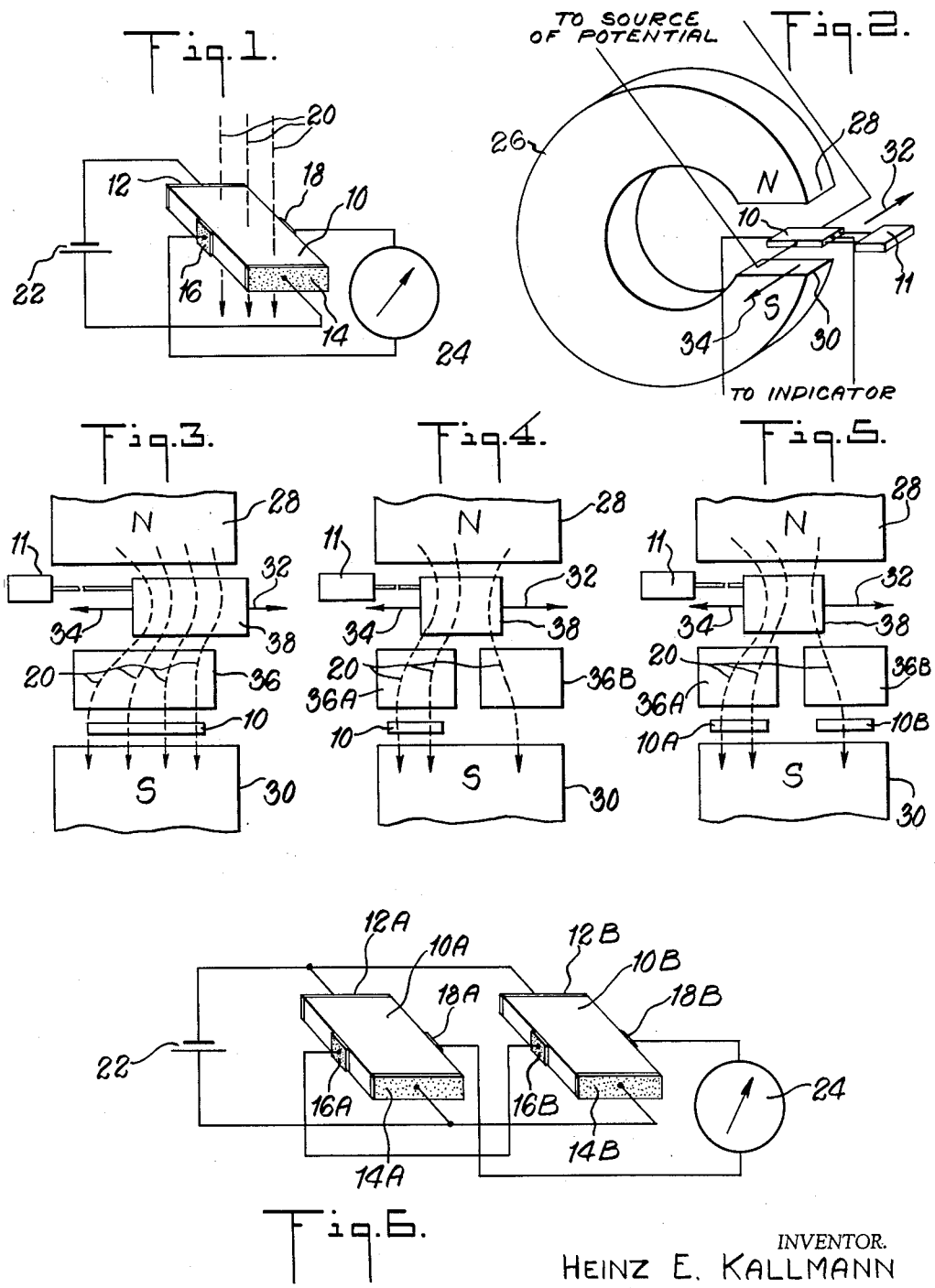
INVENTOR.
HEINZ E. KALLMANN
BY
Cyrus D. Samuelson
ATTORNEY

United States Patent Office 2,987,669
Patented June 6, 1961

2,987,669
HALL EFFECT ELECTROMECHANICAL SENSING DEVICE
Heinz E. Kallmann, New York, N.Y., assignor to Gulton Industries, Inc., Metuchen, N.J., a corporation of New Jersey
Filed Jan. 19, 1959, Ser. No. 787,771
3 Claims. (Cl. 324—45)

My invention relates to Hall effect devices and in particular to those Hall effect devices which may be employed to sense the position of a body.

It is an important object of my invention to provide such a device which senses and electrically indicates the position or displacement of an object.

It is a further object of my invention to provide such a device wherein the relation of current to displacement is linear over the intended range.

It is a still further object of my invention to provide such a device which possesses high sensitivity and is not temperature dependent.

It is a still further object of my invention to provide such a device wherein it is not necessary to attach any electrical leads to the object whose position or displacement is under observation.

These and other objects, features and advantages will be apparent during the course of the following description when taken in conjunction with the accompanying drawings wherein:

FIGURE 1 is a view showing the electrical connections made to a single Hall plate to sense the position or displacement of an object, FIGURE 2 is a perspective view of a prior art Hall effect device used to detect the position or displacement of an object, FIGURE 3 is an end elevational view of an embodiment of my invention, FIGURE 4 is a view similar to FIGURE 3 of a further embodiment of my invention, FIGURE 5 is a view similar to FIGURE 3 of a still further embodiment of my invention, and FIGURE 6 is a view similar to FIGURE 1 showing the preferred electrical connections to be made to the Hall plates shown in FIGURE 5.

In the drawings, wherein for the purpose of illustration, are shown preferred embodiments of my invention, the numeral 10 designates a Hall plate of bismuth, indium antimonide, or purified indium arsenide doped with $2 \times 10^{18}$ sulphur atoms per cm.$^3$ or other suitable material. Electrodes 12 and 14 are affixed to plate 10 at its ends and serve as the contacts through which potential from battery 22 is applied to plate 10. Electrodes 16 and 18 are applied to the opposite lateral faces of plate 10 and serve as the contacts through which plate 10 is connected to indicator 24. Lines 20 represent the magnetic field in which plate 10 is positioned.

It is well known that when a current flows in a Hall effect device and a magnetic field is applied at right angles to the current flow, an electric potential is generated which is perpendicular to both the direction of current flow and the magnetic field. This potential appears between points that were at equal electrical potential in the absence of the magnetic field, such as, for example, at the midpoints of the lateral faces of plate 10, at which points electrodes 16 and 18 have been affixed. This potential may be measured by a conventional D.-C. voltmeter 24 or by any other type of instrument which will respond to changes in potential. This potential, which is known as the Hall potential, is proportional to both the electric current and the magnetic field. Therefore, if the electric current is kept constant and the magnetic field is varied, the Hall potential will vary in accordance with the strength of the magnetic field. Thus, it can be seen that if plate 10 is moved so that it is cut by less of the lines of force 20 then previously, the potential, as displayed on indicator 24 will be less than it was before plate 10 was moved.

In FIGURE 2, Hall plate 10 is placed between poles 28 and 30 of horseshoe magnet 26. Body 11 is the body whose position is being sensed and is affixed to plate 10 so that the motion of plate 10 is a function of the motion of body 11. If plate 10 is moved in the direction of either of the arrows 32 and 34, the potential shown on the indicator will vary in accordance with the distance plate 10 is moved. It is to be noted that the measure of the displacement of plate 10 is the change in potential as measured by the indicator. Body 11, whose motion is being studied, is mechanically connected to plate 10 and mechanical damping is introduced by the leads, which for low resistance may have to be very heavy, and the mechanical connection. For the above reasons, I have found it advisable to keep the Hall plate stationary and to vary the strength of the magnetic field cut by the plate in the manner to be described below.

In FIGURE 3, there is illustrated an embodiment of my invention in which the Hall plate is stationary and body 11, whose motion is under study, is mechanically connected to the means by which the magnetic field cutting the Hall plate is varied. In FIGURE 3, as well as in FIGURES 4 and 5, the body, whose motion is being studied, may be the magnetic field-varying element 38. This is possible, for example, if the body under study may be formed of high permeability material. Moreover, while I have found it best to use a horseshoe magnet to produce the magnetic field, other magnets may be employed so long as the field cutting the Hall plate is of sufficient strength and expanse to adequately indicate changes in position of the body under study.

Hall plate 10 in FIGURE 3 is stationary and is located between the flat face of pole 30 and the flat face of stationary body 36 which is formed of high permeability material such as soft iron. Body 38 of soft iron or similar high permeability material is placed between pole 28 and body 36. Body 38 may be the body whose position is to be observed or it may be mechanically connected to body 11 as indicated in the figure. Body 38 moves in the directions of the arrows 32 and 34 and thereby causes the magnetic flux through plate 10 to vary in accordance with the position of body 38. Since the permeability of body 36 is high, there is no appreciable difference of magnetic potential throughout its volume and in particular, the face adjacent to plate 10 will be of equal potential and plate 10 will be in a homogeneous magnetic field. This magnetic field will vary in intensity in accordance with the position of body 38; but due to the inhomogeneous nature of the magnetic field in the neighborhood of a small magnet pole piece, the magnetic flux through plate 10 may not necessarily vary linearly with the displacement of moving member 38, with the faces of member 38 parallel to those of pole 28 and member 36, respectively. For instance, when moving member 38 outward in the direction of arrow 32, the flux through plate 10 may drop progressively less than required for linearity. In this case, I may taper the faces of member 38 to make it thinner near the side of arrow 34. Then, as member 38 is moved out of the gap between pole 28 and member 36, not only the cross-section of the magnetic path between pole 28 and member 36 that is filled with high permeability material will be reduced, but also the width of the air gaps between pole 28 and member 38 and/or members 38 and 36 will be progressively widened, aiding the drop-off of magnetic flux through plate 10, as required.

The embodiment of FIGURE 3 possesses the following advantages over that of FIGURE 2: there are no flexible leads connected to the moving member, and the Hall plate may respond linearly to the change in position of the body under observation. However, the embodiment of FIGURE 3 has the disadvantage that when body 38 moves from a region of high magnetic field strength to one of low magnetic field strength, magnet 26 will pull body 38 toward the region of high magnetic field strength, thereby distorting the true reading of the mechanical force causing the displacement of body 38. As a result the device will not be as accurate as is often required in the measurement of forces, such as are due to acceleration.

For such applications, I therefore prefer the embodiment illustrated in FIGURE 4 in which I have split body 36 into two bodies designated 36A and 36B and have placed Hall plate 10 between pole 30 and body 36A. Now, it can be seen that body 38 during its motion will remain in a region of substantially constant magnetic field strength while still effecting a considerable change in the magnetic flux through plate 10. As before, the motion of body 38 is in the direction of arrows 32 and 34 and the resulting position of body 38 will be indicated on the indicator associated with plate 10. Also, it should be noted that the connections from the source of potential and to the indicator on plate 10 in FIGURES 3 and 4 are the same as those shown in FIGURES 1 and 2.

While the embodiment of FIGURE 4 is linear and useful for its purpose, I prefer in some cases to use the embodiment shown in FIGURE 5. In FIGURE 5, I have provided two Hall plates designated 10A and 10B. Plate 10A is located between body 36A and pole 30 and plate 10B is located between body 36B and pole 30. The device is fully symmetrical and may be used in several ways. First, I may use plate 10A as the detecting device and not use plate 10B at all. In such a case, the operation is identical with that of the device of FIGURE 4. Similarly, I may use plate 10B alone which is also the same as the operation described for the embodiment of FIGURE 4. Second, I may connect plates 10A and 10B to separate sources of potential and to separate indicators and use the reading of one as a check on the reading of the other. Third, I may connect the two plates as shown in FIGURE 6. The input electrodes 12A, 12B, 14A and 14B are connected to battery 22 so that plates 10A and 10B are fed in parallel. The output terminals are connected in series opposition, electrodes 16A and 16B are connected together and electrodes 18A and 18B are each connected to one terminal of indicator 24. When body 38 moves in the direction of arrow 34, the output of plate 10A will increase over that of plate 10B and when body 38 moves in the direction of arrow 32, the output of plate 10B will increase over that of plate 10A. Therefore, when the embodiment of FIGURES 5 and 6 is employed, there is no output voltage reading when body 38 is at its mid-position since any residual voltage outputs of the two Hall plates are cancelled and a zero center type of indicator will linearly indicate the direction and the amount of displacement of body 38 from its mid-position. Likewise, the residual effects of temperature variations or changes in power supply voltage will not shift the zero position of the meter and thereby sources of error will be minimized further.

Devices of my invention may be used as position gauges, microphones, accelerometers or similar devices wherein it is useful to have a linear output voltage as a function of the position of a moving body.

Body 11, whose position is being sensed by devices of my invention, may be a diaphragm or membrane, a mass or any other moving element and under certain conditions may be the magnetic field-varying element 38.

While I have disclosed my invention in relation to specific examples and in specific embodiments, I do not wish to be limited thereto, for obvious modifications will occur to those skilled in the art without departing from the spirit and scope of my invention.

Having thus described my invention, I claim:

1. A Hall effect electromechanical sensing device for sensing the position of a body comprising a permanent magnet, a pair of high permeability bodies placed side by side between the poles of said permanent magnet and stationary with respect to said poles, a third body of high permeability positioned between said pair of high permeability bodies and one of said poles, a body whose position is to be sensed connected to said third high permeability body, said third high permeability body being movable in conjunction with said body whose position is to be sensed in a direction substantially normal to the magnetic field between said two poles, a Hall plate having four electrodes positioned between one of said pair of high permeability bodies and the second of said poles, two of said electrodes being applied to opposite ends of said Hall plate and two of said electrodes being applied to opposite sides of said Hall plate, the lines between each of said opposite pairs of electrodes and the magnetic field being substantially mutually perpendicular, a source of electric potential connected to two opposite electrodes of said Hall plate, and indicating means connected to the other two opposite electrodes of said Hall plate, said indicating means being responsive to the changes of the magnetic flux caused by the change in position of said third high permeability body with respect to said poles.

2. A Hall effect electromechanical sensing device for sensing the position of a body comprising a permanent magnet, a pair of high permeability bodies placed side by side between the poles of said permanent magnet and stationary with respect to said poles, a third high permeability body positioned between said pair of high permeability bodies and one of said poles, a body whose position is to be sensed connected to said third high permeability body, said third high permeability body being movable in conjunction with said body whose position is to be sensed in a direction substantially normal to the magnetic field between said two poles, a pair of Hall plates each having four electrodes positioned so that one of said Hall plates is between one of said pair of high permeability bodies and the second of said poles and the other of said Hall plates is between the second of said pair of high permeability bodies and the second of said poles, in each said Hall plate, two of said electrodes being applied to opposite ends of said Hall plate and two of said electrodes being applied to opposite sides of said Hall plate, the lines between each of said opposite pairs of electrodes of each of said Hall plates and the magnetic field being substantially mutually perpendicular, a source of electric potential connected to said two opposite electrodes of each of said Hall plates, and indicating means connected to the other two opposite electrodes of each of said Hall plates, said indicating means being responsive to the changes in the magnetic flux caused by the change in position of said third high permeability body with respect to said poles.

3. A Hall effect electromechanical sensing device as described in claim 2 wherein said source of electric potential is connected to a pair of electrodes of each said Hall plate such that equal potentials are applied to said Hall plates and the other electrodes of said Hall plates are connected in series opposition to said indicating means.

References Cited in the file of this patent

UNITED STATES PATENTS

| | | |
|---|---|---|
| 2,627,119 | Graham | Feb. 3, 1953 |
| 2,631,027 | Payne | Mar. 10, 1953 |
| 2,712,601 | Reinwald | July 5, 1955 |

FOREIGN PATENTS

| | | |
|---|---|---|
| 330,543 | Switzerland | July 31, 1958 |